United States Patent Office 3,444,114
Patented May 13, 1969

3,444,114
AQUEOUS SOLUTIONS OF WATER-SOLUBLE ALKYD RESIN AND WATER-SOLUBLE AMINO RESIN HAVING CARBOXYLIC GROUPS
Brian York Downing, Kingswinford, England, assignor to British Industrial Plastics Limited, London, England, a corporation of the United Kingdom
No Drawing. Filed May 16, 1966, Ser. No. 550,148
Claims priority, application Great Britain, May 20, 1965, 21,388/65
Int. Cl. C08g *37/32, 37/24;* B44c *1/34*
U.S. Cl. 260—21
16 Claims

ABSTRACT OF THE DISCLOSURE

There is prepared a composition suitable for coating by electrophoresis consisting essentially of an ionized aqueous solution of
(a) A resin which is an alkylated amino resin at least partially transetherified by reaction with a hydroxycarboxylic acid or an alkyl ether of an amino resin precondensate at least partially transetherified by reaction with a hydroxycarboxylic acid,
(b) A water-soluble alkyd resin, and
(c) Ammonia or an organic base.
Various articles are coated electrophoretically with such a composition.

---

This invention relates to coating surfaces by electrophoresis or electrodeposition, and especially relates to the use of certain novel resins for such coating.

One of the problems of using known mixtures of water-soluble alkyd resins and water-soluble aminoplastic resins for producing surface coatings by electrophoresis, or electrophoretic deposition, is that the two resins transport at very different rates. Consequently, the composition of the coating is very different from that of the bath and this results in variations with time. The so-called water-soluble alkyds are alkyds with a high acid number which are soluble in aqueous solutions of organic bases as salts; they are ionized, the resin giving rise to the anion. The conventional water-soluble amino resins used for coating purposes, those which are etherified by lower alcohols, generally the methyl ether, e.g. hexakis (methoxymethyl) melamine, crosslink the alkyds and produce harder coatings and increase the speed of cure, but they are not ionized, and, although some amino resin is transported with the alkyd, the proportion in the film is much lower than that in the bath.

It is the object of the present invention to provide a resinous composition containing an amino resin and an alkyd resin wherein both resins are ionized which composition is especially suitable for surface coating by the technique of electrophoresis.

According to the invention a composition suitable for coating articles by electrophoresis comprises an ionized aqueous solution of (a) a resin which is an alkylated amino resin at least partially transetherified by reaction with a hydroxycarboxylic acid or an alkyl ether of an amino resin precondensate partially or completely transetherified by reaction with a hydroxycarboxylic acid, (b) a water-soluble alkyd resin, and (c) ammonia or an organic base.

Particularly preferred amino resins which may be transetherified to give valuable resins for use as component (a) are the reaction products of formaldehyde with urea, melamine and benzo-guanamine, these being of greatest commercial importance, but the invention envisages the use of other amino resins, such as any of the amino-substituted triazine resins, for instance those listed in U.K. patent specification No. 486,519.

The alkylated amino resins are those in which a sufficient proportion of the methylol groups have been converted into ether groups by reaction with alcohols for the resins to be soluble in organic solvents. The particular alcohol used for this etherification in each case must be more volatile than the hydroxy acid used for the transetherification. Of particular importance are those resins etherified by methyl and butyl alcohols, but those from, for example, ethyl, propyl, isopropyl and amyl alcohols are also useful.

Suitable alkyl ethers of amino resin precondensates which may be transetherified to give resins useful as component (a) include, for example, the dimethyl ether of dimethylol urea (or dimethoxymethyl urea); the tetramethyl ether of tetramethylol benzoguanamine (tetrakis methoxymethyl benzoguanamine); the hexamethyl ether of hexamthylol melamine (hexakis methoxymethyl malamine); and the corresponding ethyl, propyl, isopropyl, butyl and amyl ethers.

The hydroxycarboxylic acid used to modify the alkylated amino resin or amino resin precondensate alkyl either may contain one or more hydroxyl groups, which may be, but are not necessarily, alcoholic, and which preferably are primary hydroxyl groups. Preferably also the hydroxy acid contains more hydroxyl groups than carboxyl groups. Amongst those found suitable are dimethylol propionic acid, glycollic acid, lactic acid, and gallic acid (3,4,5-trihydroxy benzoic acid); the hydroxyl groups in the last named are phenolic.

The products formed by condensing 1 mol of a glycol and 1 mol of a dicarboxylic acid or anhydride, e.g.

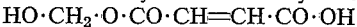

which is obtained from ethylene glycol and maleic anhydride, are also suitable as hydroxycarboxylic acids, as also are products of high acid number obtained by some further condensation of such products. However, it should be noted that the condensation must not be carried too far, otherwise the proportion of both free carboxyl and free hydroxyl groups becomes too low.

The production of the resin components (a) is the subject of my copending U.S. patent application Ser. No. 550,107 filed May 16, 1966, and may be illustrated by the following equation, which shows the transetherification, by means of a hydroxycarboxylic acid, of the etherified amino resin or precondensate:

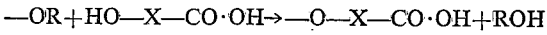

Thus it will be seen that the free carboxyl groups are transferred to the resin, and are thus available for the production of water-soluble salts with ammonia or organic bases, and it is this feature which makes the modified resins suitable for electrophoretic applications.

Particularly suitable alkyd resins which may be used as component (b) in the compositions of the invention are those based on dimethylol propionic acid and trimellitic acid, and others of high acid number and fairly high molecular weight so as to be soluble in aqueous base but not water. Another suitable alkyd is that made by condensing 1 mole linseed oil with 3 moles maleic anhydride to an acid value of 190–200.

The weight ratio of component (b) to component (a) in the coating composition will generally be between 1:1 and 19:1, preferably between 7:3 and 9:1. In some cases it is desirable to include in the coating solution a small amount of a solvent, e.g. an alcohol or an ether, to assist in film formation.

As component (c) there my be used ammonia or an organic base, and preferably the organic base is one having a boiling point below the stoving temperature (about 140° C.) so that in the event that some of the base is carried over with the coating resin mixture during electrophoresis it is evaporated during stoving. Suitable organic bases include dimethylamino ethanol and triethylamine. Preferably the ammonia or organic base is added in an amount sufficient to give the coating composition a pH value of 6.5 to 9.0.

The following examples are given to illustrate the invention. Examples 1 to 6 illustrate the production of various components (a) and their aqueous solutions in basic solvents. Their electrophoretic properties are demonstrated in Examples 8, and it should be mentioned that the combination of any of these aqueous basic solutions with a water-soluble alkyd resin is suitable for coating by electrophoresis. Examples 7 and 9 to 12 illustrate typical compositions according to the invention and their use in electrophoretic coating.

Example 1

1560 gms. (4 moles) of a commercial grade of hexamethoxy-methyl melamine and 268 gms. (2 moles) 1,1-dimethylol propionic acid were charged into a 2-litre reaction vessel fitted with a stirrer, thermometer, still head and condenser. Over a period of 25 minutes the batch was heated to 119° C., at which point methanol began to distil over. The reaction temperature was raised to 128° C. over a further period of 50 minutes and a total of 128 gms. (4 moles) methanol were collected. The resultant resin was then cooled.

The viscosity at 25° C. of a 70% solution of the resin in xylol was 5.2 stokes and the acid value (mgms. of KOH required to neutralize 1 gm. of resin) 40.

200 gms. of the solid resin were dissolved in 45 gms. isobutanol and 150 gms. water were added. Upon adjusting the pH of the mixture to 7.8 by the addition of 10 gms. dimethyl-amino ethanol a clear homogeneous solution was obtained.

Example 2

1666 gms. 36% formalin were charged in to a 5-litre reaction vessel fitted with an agitator, thermometer and reflux condenser. The pH of the formalin was adjusted to 9.5 by the addition of 3 mls triethylamine and then 1800 gms. water and 748 gms benzoguanamine were added. The batch was heated to 70° C. in 60 minutes during which time the benzoguanamine dissolved and a clear solution was obtained. The batch was then maintained at 70° C. for a further 60 minutes. During this time the pH of the solution was kept at 9.0–9.5 by addition of small quantities of triethylamine. After 60 minutes at 70° C. crystals of tetramethylol benzoguanamine began to deposit from solution. The batch was then cooled to room temperature over a period of 6 hours. The product was filtered off and washed with 3 litres water followed by 1 litre methanol. The product was then dried in an oven at 40° C. for 18 hours.

The yield was 1145 gms. of a material containing 3.97 methylol groups per mole of benzoguanamine.

To 450 gms. of the above material were added 1050 gms. ethyl alcohol and 7.5 mls. concentrated hydrochloric acid. The charge was heated to 35° C. and was held at this temperature for 1 hour. During this time the tetramethylol benzoguanamine dissolved and a clear solution was obtained. The batch was then cooled to room temperature and its pH adjusted to 7.0–7.5 using 20% sodium hydroxide solution. The excess ethyl alcohol was removed by vacuum distillation and the resin was finally filtered.

The yield was 561.9 gms. of a product having a molar ratio of combined reactants benzoguanamine: formaldehyde:ethyl alcohol of 1:3.7:3.25.

126 gms. of the etherified benzoguanamine resin and 23.5 gms. glycollic acid (97%) were heated to 110° C. in 15 minutes. At this point ethanol began to distil over. In the next 15 minutes the reaction temperature was raised to 128° C. during which time 18 mls. ethanol were collected. The resultant resin was then cooled.

The viscosity at 25° C. of a 75% solution of the resin in xylol was 4.3 stokes and the acid value 88.

25 gms. of the resin were dissolved in 5 gms. isopropanol and 22.5 gms. water were added. Upon adjusting the pH of the mixture to 7.5 by the addition of 2.5 gms. dimethylaminoethanol, a clear solution was obtained which could be infinitely diluted with water.

Example 3

111 gms. (0.75 mole) of the dimethyl ether of dimethylol urea, prepared in accordance with British patent specification No. 558,683, and 47 gms. (0.25 mole) gallic acid monohydrate were heated to 80° C. in 12 minutes. During the next 15 minutes the reaction temperature was raised to 90° C. and during this time 18 gams. methanol distilled over. The resin was cooled and blended with 2-methoxy-ethanol to give a solution containing 60% solids content.

The viscosity at 25° C. of a 60% solution of the resin in 2-methoxy-ethanol was 11.1 stokes and the acid value 102.5

To 20 gms. of the resin solution were added 10 gms. water and 1 gm. concentrated ammonia (SG 0.88). A clear homogenous solution was obtained having a pH of 6.9. This solution could be infinitely diluted with water.

Example 4

740 gms. (10 moles) n-butanol, 366 gms. (10 moles) 82% formaldehyde and 1 ml. N.NaOH were charged into a 2-litre reaction vessel fitted with an agitator, thermometer, azeotropic decanter and condenser. The mixture was heated to 70° C. over a period of 25 minutes and a clear solution was obtained having a pH of 8.5 240 gms. (4 moles) urea were then added and the temperature was raised to 100° C. over 15 minutes. 100 mls. xylol and a catalyst consisting of 4 gms. phthalic anhydride were then added and the resin solution was distilled; water being removed from the system via the decanter. In 5¼ hours a total of 215 mls. of aqueous distillate were obtained. During this period the reaction temperature rose from 100–123° C. The product was then cooled and filtered. A clear water-white resinous solution was obtained having a solids content of 55% and a white spirit dilution, i.e. number of mls. of solvent tolerated by 5 gms. of resin solution, of 42.2 mls.

186 gms. of the resin solution were distilled at 50° C. under a vacuum of 4 mm. mercury. When 50 gms. of solvent had been removed 40 gms. 1,1-dimethylol propionic acid were added and the batch temperature was raised to 110° C. At this point a vacuum of 4 mm. mercury was applied and the resin was distilled to remove a further 36 gms. of solvent. The product was then cooled and blended with 60 gms. butyl Cellosolve giving a solution containing 70% solids.

The viscosity at 25° C. of a 70% solution of the resin in butyl Cellosolve was 27.5 stokes and the acid value 130.

50 gms. of the above solution were blended with 15 gms. water and the pH of the mixture was adjusted to 7.5 with dimethyl-aminoethanol. A clear solution was obtained which could be diluted with half of its own weight of water before haziness occurred.

Example 5

A mixture consisting of 130 gms. BE. 669 (a commercial grade of the hexamethyl ether of hexamethylol melamine) and 34 gms. lactic acid (88%) were heated to 60° C. and a vacuum of 4 mm. mercury was applied. The reaction temperature was then raised to 115° C. over a period of 30 minutes during which time 17 gms. of a mixture of methanol and water distilled over. The resin was finally cooled.

The viscosity at 25° C. of a 75% solution of the resin in n-butanol was 2.1 stokes and the acid value 73.

25 gms. of the solid resin were dissolved in 10 gms.

butyl Cellosolve and 10 gms. water were added. Upon adjusting the pH of the mixture to 7.3 by the addition of 3 gms. dimethyl-amino ethanol a clear homogeneous solution was obtained which could be diluted with half of its own weight of water.

Example 6

248 gms. (4 moles) ethylene glycol and 392 gms. (4 moles) maleic anhydride were heated to 175° C. in 1 hour, the reaction mixture being purged with nitrogen. The batch was maintained at 175–180° C. for a further 30 minutes during which time 22 mls. water distilled out. The product had an acid value of 295 and at this stage was cooled to room temperature.

48 gms. of the above ester and 117 gms. BE. 669 (a commercial grade of the hexamethyl ether of hexamethylol melamine) and 34 gms. lactic acid (88%) were heated to 110° C., at which point methanol began to distil over. In 20 minutes the reaction temperature was raised to 126° C. and a total of 11 mls. methanol were collected. The resin was then cooled to room temperature.

The viscosity at 25° C. of a 75% solution of the resin in xylol was 35.75 stokes and the acid value 66.

35 gms. of the solid resin were dissolved in 15 gms. alcohol and 20 gms. water were added. Upon adjusting the pH of the blend to 7.2 by the addition of 4.5 gms. triethylamine a clear solution was obtained which could be infinitely diluted with water.

Example 7

The resin of Example 1 was compared with the hexamethyl ether of hexamethyl melamine when blended with a water-soluble maleinized oil alkyl resin, produced by condensing 1 mole linseed oil with 3 moles maleic anhydride to an acid value of 190–200, and used to produce coatings by electrodeposition. In each case a solution was prepared using deionized water as the solvent and containing, in 100 parts by weight, 3 parts by weight amino resin solids and 7 parts by weight alkyl resin solids. The solution was adjusted to pH 7.8 (glass electrode) with dimethylamino ethanol. A film was deposited on a degreased tin steel anode of area 28.8 sq. ins., using at 25° C. 0.8 ampere for 1 minute. After washing with distilled water, the film was cured by stoving for 30 minutes at 150° C.

The stoved film containing the resin of Example 1 weighed 0.15 g. and contained 18% by weight of the melamine resin as estimated by a micro Kjeldahl nitrogen determination, allowing for the blank due to the alkyd resin. The comparison film weighed 0.16 g. and contained only 10% by weight of the melamine resin.

Example 8

The anionic properties of each of the resins of Examples 2–6 were tested by diluting the basic solutions obtained in those examples with deionized water to 10% solids content and applying a current density of 2 amperes per sq. ft. to degreased tinned steel electrodes immersed in the solution. In each case the resin migrated to the anode and formed a coating.

The following Examples 9 to 12 illustrate the use of the resins prepared as described in Example 1, 2 and 5 in coating compositions comprising two alkyd resins, designated "Alkyd C" and "Alkyd D" respectively. The preparation of the two alkyd resins is described first.

Preparation of Alkyd C 2.5 moles coconut fatty acid and 2.5 moles glycerol were reacted together at 180–185° C. until the acid value fell to 27. Then 5.5 moles neopentyl glycol, 1.0 mole maleic anhydride, 3.0 moles trimellitic anhydride and 1.0 mole adipic acid were added and reaction continued at the same temperature until an alkyd was obtained having an acid value of 55. 75 parts by weight of this resin were dissolved in 25 parts by weight isobutanol and the solution was diluted with 650 parts by weight deionised water and sufficient dimethylaminoethanol to adjust the pH to 7.8.

Preparation of Alkyd D 248 gms. propylene glycol, 160 gms. pelargonic acid, 287.5 gms. Cardura E, 444 gms. phthalic anhydride, 402 gms. 1,1-dimethylol propionic acid, 146 gms. adipic acid, and, 49 gms. maleic anhydride were charged to a 2-litre split reactor with straight condenser and tube for bubbling a slow stream of nitrogen. The charge was heated slowly to 195° C. in 3 hours and was then held at 195–200° C. until the acid value fell to 48 in about 10 hours. It was then cooled to 110° C. and 520 gms. isobutanol were added.

("Cardura E" is a trade name and is the glycidyl ester of a mixture of tertiary acids, formula

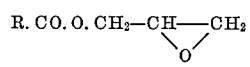

where R represents a mixture of branched chain tertiary radicals with a total of 8 to 10 carbon atoms.)

Example 9

The resin of Example 1 was diluted to 10% by weight solids and was mixed with Alkyd C (also at 10% solids) in the proportion of 80 parts alkyd to 20 parts amino resin, the solution being adjusted to pH 7.8 with dimethylaminoethanol. A film was deposited on a degreased tinned steel anode of area 28.8 sq. ins., the solution being at 20° C. and the film was stoved for 30 minutes at 145° C. It was found that good films could be obtained using constant voltage and constant current in the range 40 to 80 volts D.C. and 1.5 to 3 amperes per sq. ft. The mixture showed a coulombic yield of 11.9 mg. per coulomb. Films produced had a melamine content of 17% as estimated from the formaldehyde content of the film using the dimedone method. Further experiments showed that good films could be obtained within the pH range of 6.5 to 9 and with Example 1 resin/alkyd ratio between 5/95 and 40/60 by weight.

Example 10

The resin of Example 2 was diluted to 10% by weight solids with deionized water and adjusted to pH 7.8 with dimethylaminoethanol. It was tested for electrodeposition using degreased tin electrodes of area 28.8 sq. in., the temperature of the bath being 25° C., by applying a current of ½ amp. for 1 minute. A film was deposited and was stoved for 30 minutes at 145° C., and there was obtained a coulombic yield of 6.8 mg. per coulomb.

The same resin solution was mixed with Alkyd C (also at 10% solids) using 1 part by weight amino resin to 4 parts by weight alkyd and tested under the same conditions, giving a coulombic yield of 8.3 mg. per coulomb. When Alkyd C was replaced by Alkyd D (conditions otherwise the same) the yield was 7.4 mg. per coulomb.

Example 11

Similar experiments to those described in Example 10 were carried out using the resin of Example 5 as the amino resin, with the following results:

| | Mg. per coulomb |
|---|---|
| Coulombic yield Example 5 resin alone | 3.8 |
| Coulombic yield Example 5 resin and Alkyd C | 7.5 |
| Coulombic yield Example 5 resin and Alkyd D | 6.4 |

Example 12

Similar experiments to those described in Example 10 were carried out with the resin of Example 1, with the following results:

| | Mg per coulomb |
|---|---|
| (a) Coulombic yield Example 1 resin alone | 7.1 |
| (b) Coulombic yield Example 1 resin and Alkyd C | 11.9 |
| (c) Coulombic yield Example 1 resin and Alkyd D | 12.3 |

Analysis of the films produced showed that (b) contained 17.0% by weight of the melamine resin and (c) contained 15.3% by weight.

What is claimed is:

1. A composition suitable for coating by electrophoresis consisting essentially of an ionized aqueous solution of
   (a) a resin which is an alkylated amino resin at least partially transetherified by reaction with a hydroxycarboxylic acid or an alkyl ether of an amino resin precondensate at least partially transetherified by reaction with a hydroxycarboxylic acid,
   (b) a water-soluble alkyd resin, and
   (c) ammonia or an organic base.

2. A composition according to claim 1 wherein the pH of the aqueous solution is in the range 6.5 to 9.0.

3. A composition according to claim 1 wherein the amino resin is a urea-formaldehyde reaction product, a melamine-formaldehyde reaction product or a benzoguanamine-formaldehyde reaction product.

4. A composition according to claim 1 wherein the amino resin has been alkylated by reaction with an alcohol having 1 to 5 carbon atoms.

5. A composition according to claim 1 wherein the amino resin precondensate has been reacted with an alcohol having 1 to 5 carbon atoms.

6. A composition according to claim 1 wherein the alkyd resin is one based on dimethylol propionic acid or trimellitic acid.

7. A composition according to claim 1 wherein the alkyd resin is that made by condensing 1 mole of linseed oil with 3 mole maleic anhydride to an acid value of 190–200.

8. A composition according to claim 1 wherein the hydroxycarboxylic acid is dimethylol propionic acid, gallic acid, lactic acid or glycollic acid.

9. A composition according to claim 1 wherein the hydroxycarboxylic acid is that made by condensing a glycol and a dicarboxylic acid or anhydride.

10. A composition according to claim 1 wherein the organic base has a boiling point below 140° C.

11. A composition according to claim 10 wherein the organic base is dimethylamino ethanol or triethylamine.

12. A composition according to claim 1 wherein the ratio by weight of component (b) to component (a) is between 1:1 and 19:1.

13. A composition according to claim 12 wherein the ratio by weight of component (b) to component (a) is between 7:3 and 9:1.

14. A composition suitable for coating by electrophoresis consisting essentially of 100 parts by weight of an ionized aqueous solution containing:
   (a) 3 parts by weight of a resin made by reacting hexa-methoxy melamine with dimethylol propionic acid,
   (b) 7 parts by weight of an alkyd resin made by condensing 1 mole of linseed oil with 3 moles maleic anhydride to an acid value of 190–200, and
   (c) sufficient dimethylamino ethanol to render the pH of the solution about 7.8.

15. An article coated electrophoretically by means of a composition according to claim 1.

16. An article coated electrophoretically by means of a composition according to claim 14.

References Cited

UNITED STATES PATENTS

| | | | |
|---|---|---|---|
| 2,680,734 | 6/1954 | Dearing | 260—70 |
| 2,304,288 | 12/1942 | Swain | 260—404.8 |
| 3,133,032 | 5/1964 | Jen et al. | 260—29.4 |
| 3,207,715 | 9/1965 | Stephens | 260—22 |
| 3,230,162 | 1/1966 | Gilchrist | 204—181 |
| 3,345,313 | 10/1967 | Ruhf et al. | 260—22 |

DONALD E. CZAJA, *Primary Examiner.*

R. W. GRIFFIN, *Assistant Examiner.*

U.S. Cl. X.R.

117—132, 134, 161, 167; 260—22, 29.4, 32.4, 32.6, 33.2, 33.4, 850